United States Patent [19]

Fithian et al.

[11] Patent Number: 4,724,441
[45] Date of Patent: Feb. 9, 1988

[54] TRANSMIT/RECEIVE MODULE FOR PHASED ARRAY ANTENNA SYSTEM

[75] Inventors: Michael J. Fithian; Vincent A. Hirsch, both of Boulder; Kenneth R. Zurawski, Lafayette; Alvaro Medina, Boulder, all of Colo.

[73] Assignee: Ball Corporation, Muncie, Ind.

[21] Appl. No.: 867,848

[22] Filed: May 23, 1986

[51] Int. Cl.[4] .............................................. H01Q 3/22
[52] U.S. Cl. .................................... 342/368; 342/463
[58] Field of Search ..................... 342/59, 74, 81, 102, 342/103, 157, 368–377, 463–465

[56] References Cited

U.S. PATENT DOCUMENTS

| | | | |
|---|---|---|---|
| 3,130,410 | 4/1964 | Gutleber | 343/844 |
| 3,307,188 | 2/1967 | Marchetti et al. | 342/373 |
| 3,308,465 | 3/1967 | Tamama | 342/368 |
| 3,327,215 | 6/1967 | Battin et al. | 325/23 |
| 3,386,092 | 5/1968 | Hyltin | 342/157 |
| 3,417,393 | 12/1968 | Cooke et al. | 342/157 |
| 3,517,389 | 6/1970 | Dausin | 342/157 X |
| 3,525,940 | 8/1970 | Quesinberry | 325/120 |
| 3,579,111 | 5/1971 | Johnannessen et al. | 325/141 |
| 3,685,050 | 8/1972 | Cartwright | 342/6 |
| 3,922,674 | 11/1975 | Gingras, Jr. et al. | 342/51 |
| 4,101,902 | 7/1978 | Trigon | 342/374 |
| 4,124,852 | 11/1978 | Steudel | 342/374 |
| 4,258,363 | 3/1981 | Bodmer et al. | 342/157 |
| 4,445,119 | 4/1984 | Works | 342/377 |

Primary Examiner—Theodore M. Blum
Assistant Examiner—Bernarr E. Gregory
Attorney, Agent, or Firm—Gilbert E. Alberding

[57] ABSTRACT

A phased array antenna system includes a plurality of active radiating antenna elements each of which is driven by and each of which drives a transceiver module located closely adjacent thereto. Each transceiver module includes a high-power pulse signal-transmitting amplifier powered by a high-capacitance, low current dc rectifier system to minimize charging currents and provide very high pulse currents, and a low-noise amplifier for amplifying the received signal. The modules further include a transmit/receive switch, phase adjusting circuits in the input to the high-power signal-transmitting amplifier and in the output to the low-noise signal-receiving amplifier for normalizing the signal phase, and amplitude limiting means in the input of the low-noise signal receiving amplifier for protecting the low-noise amplifier during the transmit mode. The transceiver module utilizes microstrip line technology to provide tuned circuit elements, is compact in size and low in cost, and permits an improvement in noise, gain, and radiated power characteristics to be realized in phased array radar systems.

11 Claims, 4 Drawing Figures

TRANSMIT/RECEIVE MODULE FOR PHASED ARRAY ANTENNA SYSTEM

BACKGROUND OF THE INVENTION

The present invention relates generally to phased array antenna systems and, more particularly, to systems having compact, low-cost transmitter-receiver modules housed for location closely adjacent and for connection with active, radiating antenna elements.

Radar and communications systems frequently require antenna arrays for long-range detection and communication. Such antenna systems are frequently quite large and because of their large size are not manipulatable to direct radiant energy for scanning and search purposes. Such large arrayed antenna systems have included means for shifting the phase of the signals directed to the individual radiators of the array, to vary the polarization of the radiated energy, to create well-defined, directed beams of radiated energy, to concentrate the radiated power for longdistance detection and communication, and to provide a steerable beam. Individual transmitters and receivers have been used for each radiator in the array to develop high transmitting power from a single antenna through the total effect of the individual smaller power transmission of each radiator element and its associated transmitter. In such an active, phased array antenna system, it is desirable that both the transmitted signal and the received signal be amplified for each antenna element in the array. Such antenna systems provide improved signal-to-noise ratios and efficiency and more effective radiated power compared to systems which do not provide amplification for each antenna element. In many prior systems, the cost and size of the individual transmit/receive apparatus prevented their use in very large, multi-element, phased array systems.

U.S. Pat. Nos. 3,307,188; 3,130,410; and 4,258,363 disclose antenna array systems in which each radiating element in the array includes an associated transmitter/receiver. None of these systems, however, discloses a fully integrated, compact, low-cost module adapted for incorporation into large, phased array radars, for physical positioning closely adjacent the radiating elements of the array, and for marked improvement in the noise, gain and radiated power characteristics of the system.

SUMMARY OF THE INVENTION

The invention provides a phased array antenna system for high-frequency electromagnetic signals with substantially improved performance and ease of control through the introduction of a compact, low-cost, self-contained, transmit/receive amplifier module with individualized phase control of high peak power output pulses and low noise signal amplification.

A phased array antenna system of this invention includes a plurality of antenna elements for radiating and receiving high-frequency signals, such as C-band signals of about 4 to about 8 Gigahertz. A plurality of compact transmitting and receiving amplifier modules are located closely adjacent to and connected with an associated one or more of the plurality of antenna elements. Each of the transmitting and receiving amplifier modules includes a high-power, pulsed, signal-transmitting amplifier; a low-noise, signal-receiving amplifier; signal phase adjusting circuits in the input to the high-power, pulsed, signal-transmitting amplifier and in the output of the low-noise, signal-receiving amplifier; a transmit/receive switch; and limiter means in the input of the low-noise signal-receiving amplifier for limiting the signal amplitude of the received signal to a predetermined level to protect the low-noise signal-receiving amplifier. Each transmitting and receiving amplifier module is compactly housed in such a manner that it may be conveniently connected into the phased array antenna system closely adjacent its associated antenna element.

A plurality of stub tuners is connected with the path for the received signal from the low-noise receiving amplifier and with the path for the signal input to the high-power output amplifier. The effect of the stub tuners is to tune gallium arsenide field-effect transistors for optimum performance. A pair of PIN diodes is connected in the module in tuned relationship with the connection to the system control to provide a transmit/receive switching function. The module also employs a PIN diode to prevent signals above a predetermined power level from reaching and damaging the low-noise-receiving amplifier. The module includes an effective supply of high peak currents to the pulse of the high-power output amplifier with a high-capacitance, dc-rectifier system which minimizes charging currents.

Further features and advantages of the invention will be apparent from the following detailed description of a presently preferred embodiment.

DETAILED DESCRIPTION OF THE PREFERRED EMBODIMENTS

Figure 1:
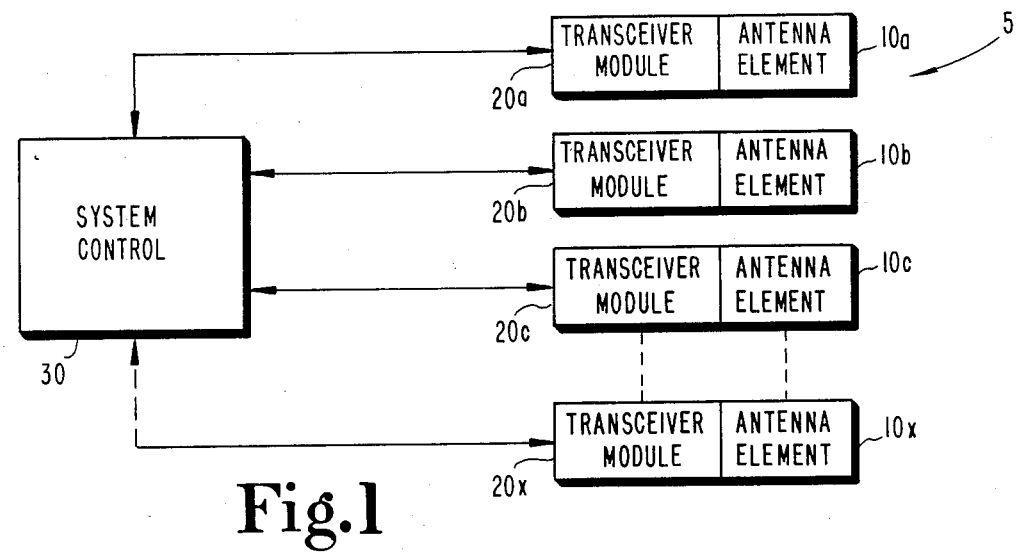
FIG. 1 schematically illustrates a phased array antenna system of the invention.

FIG. 1 schematically illustrates a phased array antenna system of the invention. The antenna system is generally designated by reference numeral 5 and includes a plurality of active, radiating, antenna elements 10a, 10b, 10c . . . 10x. Each active, radiating element 10a-10x drives and is adapted to be driven by a transmit/receive module or transceiver module 20a, 20b, 20c . . . 20x, respectively. As described in greater detail below, modules 20a-20x provide amplification for both the transmitted and received signal in a lowcost, compact package that can be positioned closely adjacent the radiating elements, and that can be easily interfaced with a communications system control. Although the invention is not so limited, the illustrated preferred embodiment is particularly adapted for use in a radar system operating in the C-band. The C-band is a radio frequency band of about 4 to about 8 GHz with wavelengths of about 7.50 to about 3.75 centimeters.

The system of FIG. 1 further includes a system control 30 coupled to signal connections, the amplitudeadjustment circuits, and the transmit/receive switches in each of the modules 20a-20x for generating and controlling the amplitude of the outgoing and incoming signals at each radiating antenna element.

Figure 2:
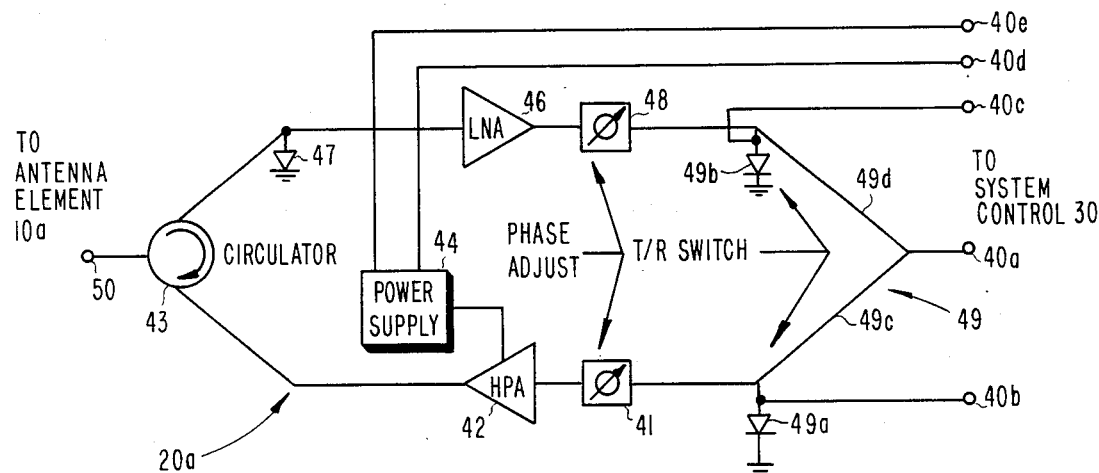
FIG. 2 illustrates, in diagrammatic form, one of the transceiver modules of FIG. 1.

FIG. 2 illustrates in diagrammatic form one of the transceiver modules 20a connected to radiating antenna element 10a. Except for the system connections to the high-power transmitter amplifier and transmit/receive switch of module 20a, the dc bias connections for the components of the module are not shown in FIG. 2. The connections for radio frequency energy between the modules and the system control and antenna elements are preferably coaxial connectors. Inasmuch as each of transceiver modules 20a-20x is identical in construction, only one shall be described.

As shown in FIG. 2, in the transmit mode of operation of the system, a transmit signal at system connection 40a is adjustable in phase at antenna element 10a by phase adjustment means 41. The phase adjusted signal is then amplified by high-power amplifier 42 and directed through circulator 43 and antenna connection 50 to antenna element 10a to be transmitted. High-power amplifier 42 is designed for pulse operation and is powered by a power supply 44 capable of providing very high peak currents, triggered by the system control 30, over connection 40d, during each pulse of operation while minimizing average charging current.

In the receive mode of operation, a signal received by antenna element 10a is directed through antenna connection 50 and circulator 43 to a low-noise amplifier 46. Low-noise amplifier 46 is protected during the transmit mode and against excessively high-level incoming signals by a limiter means 47. The amplified received signal is adjustable in phase by phase adjustment means 48. The received, phase-adjusted signal is transmitted through the system connection 40a.

Transmit/receive switch 49, including PIN diodes 49a and 49b select the transmit and receive modes of operation of the module and are operated from the system control 30 over connections 40b and 40c. The wavelength of the paths 49c and 49d between the system connection 40a and the PIN diodes 49a and 49b, respectively, is such that the application of a small d.c. current through connections 40b and 40c, respectively, to either of PIN diodes 49a and 49b and the consequent reduction of diode impedance will make the pathway in which the actuated PIN diode 49a and 49b lies appear to have infinite (very high) impedance.

Thus, the module 20a is connected to the remote central control system 30 by connections, indicated generically by 40a, 40b, 40c, 40d, and 40e, and to the associated radiating antenna element 10a through connection 50. A signal to be transmitted by radiating antenna element 10a is received at system connection 40a and travels along a transmission path through the high-power amplifier to antenna connection 50. A signal received by the radiating antenna element 10a is received by the antenna connector 50 and directed along a receiving path through the low-noise amplifier to system connection 40a and then to the remote system control 30 for processing. Routing of the transmitted and received signals is accomplished by transmit/receive switch 49 through the change of impedance of PIN diodes 49a and 49b. Thus, T/R switch 49 includes PIN diodes 49a and 49b whose conductivities are controlled by the application of d.c. currents over connections 40b and 40c. PIN diodes 49a and 49b are located within the pathway for the transmitted signal and for the received signal, respectively, in such manner that, at the system connection 40a, they form in conjunction with the pathways 49c and 49d between the system connection 40a and the PIN diodes a pair of tuned quarter wave transformers, each of whose impedance at the system connection 40a is controlled by the impedance of the PIN diode in the pathway. Thus, conduction of PIN diode 49b will direct a transmit signal present at system connector 40a to the high-power amplifier 42 and prevent it from reaching low-noise-receiving amplifier 46, and conduction of PIN diode 49a will prevent a received and amplified signal from reaching the high-power amplifier.

A transmit signal routed to high-power amplifier 42 is initially adjusted in phase by phase adjustment means 41 which comprises a plurality of stub tuners to provide phase control of the transmitted signal to each antenna element, and phase adjustment means 48 can normalize the phase for the received signals of all the modules 20a-20x. Phase adjustment means 41 and 48 can be substantially identical. In phased array antenna systems, control of the phase characteristics of the incoming and outgoing signals at each antenna element are important in analyzing the information content of the incoming signal and controlling the radiation from the antenna system.

Phase adjustment means 41 and 48 are passive circuits, comprising capacitive open circuit stub transmission lines 41a, 41b, 48a, 48b (FIG. 4) separated by one-quarter wavelength. Phase adjustment is generally accomplished during installation of the modules by increasing or decreasing the length of the stub (adjusting its impedance and its effect on the energy through the circuit) or by adding or subtracting capacitive, open circuit stubs in shunt with the through line of each pathway.

The phase-adjusted transmit signal is amplified in high-power amplifier 42. High-power amplifier 42 comprises a two-stage amplifier using field-effect transistors and printed circuit impedance-matching structures. The high-power amplifier transistors are used in a pulsed mode, and are connected with power supply 44. The amplified transmit signal is then directed to the antenna connection 50 by means of ferrite circulator 43. Circulator 43 provides a low-loss path from the high-power amplifier 42 to the antenna connection 50.

Figure 3:
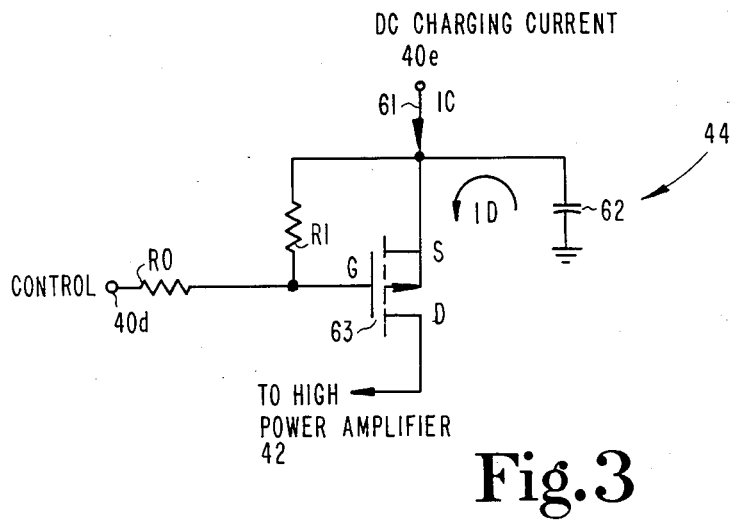
FIG. 3 illustrates the power supply for the high-power amplifier of FIG. 2.

The power supply 44 for high-power amplifier 43, which is an important part of the module, is shown in FIG. 3. Power supply 44 comprises a high-capacitance, d.c. rectifier system to minimize average charging current and to provide very high pulse currents in the module and to eliminate high current conductors that must be shielded to prevent electromagnetic interference. Power supply 44 includes a relatively low-current rectifier (not shown) and a high capacitance 62 which stores energy and releases it within the module to the high-power amplifier 42 during its pulsed operation. Capacitor 62 must be selected in such a way that it furnishes the high-power amplifier current and still maintains the high-power amplifier voltage within supply requirements (e.g., v=0.5 volts). Power supply 44 thus receives a low d.c. charging current (200 milliamps per high-power amplifier) input 61 during the full length of the receive period (approximately 600 microseconds). The energy stored in capacitance 62 can be calculated from the formula $E=CV^2/2$, where C is the value of the capacitance 62 and V is the voltage to which capacitance 62 is charged. Because of the long charging time (600 microseconds), high energy can be stored in the capacitance 62 with low-charging current; and the rate of charging of capacitance 62 can be limited to a low average value. During the transmit mode, a trigger device 63 is actuated from the system control 30 over control connection 40d (FIG. 2); and the stored energy at capacitance 62 is released to the power amplifier 42 at a high rate (3 amps per high-power amplifier) for a short time interval equal to 33 microseconds (duty cycle of 5.3%). By using a capacitive discharge approach, long, high-current paths and the associated electromagnetic interference are eliminated; and the power supply 44 can be located adjacent the high-power amplifier 42 in each module to minimize power losses and electromagnetic interference (EMI).

A received signal at antenna connection 50 from the antenna element 10a is routed by circulator 43 to low-noise amplifier 46 via limiter 47. Circulator 43 provides a low-loss path for received signals to the receiver amplifier 46 and a high-loss path for received signals from high-power amplifier 42. Limiter 47 is a PIN diode in shunt with the received signal. Limiter 47 begins to self-bias if the incoming signal level is high enough to damage the sensitive, low-noise amplifier transistors. When biased, the limiter PIN diode 47 increases the impedance of the signal pathway at the circulator to essentially an infinite impedance and acts to reflect the incoming signal on line 47a and is particularly effective in protecting the low-noise amplifier during the transmit mode.

If the received signal is at the expected low level, it will be amplified by low-noise amplifier 46. This amplifier 46 serves to improve the sensitivity of the antenna to received signals by its low-noise contribution. It uses low-noise, high-gain, field-effect transistors with appropriate impedance-matching structures. The amplified signal from the low-noise amplifier 46 is then acted upon by phase adjustment means 48 to normalize the phase for the received signals of all the transceiver modules 20a-20x.

From the phase adjustment circuit, the received signal is routed to system connection 40a by T/R switch 49.

Figure 4:
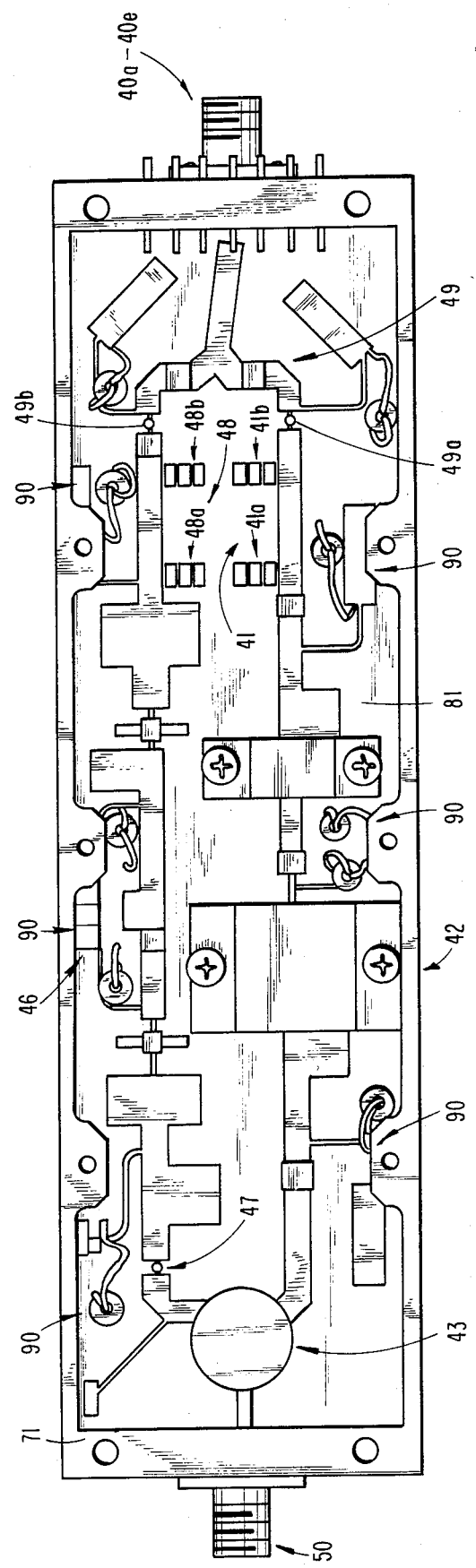
FIG. 4 illustrates the layout of the microstrip printed circuit board and components of the transceiver module of FIG. 2.

FIG. 4 illustrates the printed circuit board layout of the transceiver module 20a. The entire unit is packaged into a small, lightweight, conductive housing 71. The unit uses designed pathways and packaged, active devices (transistors and diodes) which lead to low-cost-assembly techniques.

The active portion of the transmit/receive module of this invention are formed by and carried by an etched printed circuit board 81. The printed circuit board, using microstrip line techniques, forms with the housing 71, the pathways for the radio frequency energy, the stub tuners for the phase adjusting circuits 41 and 48 and the d.c. return of the limiter 47 and the d.c. bias points for the transmit/receive switch 49. In addition, printed circuit board 81 carries, appropriately connected, the PIN diodes, low-noise, field-effect transistors and high-power, field-effect transistors of the module, and as indicated in FIG. 4, provides dc bias connections 90 to the diodes and transistors. The dimensions of the conductive portions of the printed circuit board and the housing are such that the modules elements are tuned to operate with C-band radio frequency energy. Because the housing is conductive, preferably a metal, the microwave energy is confined within the housing 71; and the modules can be closely spaced to each other and to the antenna elements without interfering with each other.

As shown in FIGS. 2 and 4, the pathways for the signal to be transmitted and the received signal between the coaxial system connector 40a and the PIN diodes 49a and 49b of the transmit/receive switch are one-quarter wavelength. Upon application of a dc current to PIN diode 49b and its reduction in impedance to essentially nothing, the impedance of the pathway through the low-noise amplifier appears to be essentially infinite to the energy entering the system connector 40a, thus, PIN diode 49b is energized from the system control over connection 40c during the transmit mode of operation. Alternatively, to establish the receive mode of operation, a dc potential is applied to PIN diode 49a, reducing its impedance to essentially zero, thereby resulting in an essentially infinite impedance for the pathway through the high-power amplifier where the pathway joins at the system connector 40a. As indicated in FIG. 4 a transmit/receive module of this invention may be about 0.5 to 0.7 wavelength in width and about 1.75 to 3.5 wavelengths long.

Because of their low cost, the modules can be readily used in large, multi-element, phased array radar applications. The compact size of the modules permits them to be physically positioned closely adjacent the radiating elements 10a-10x. By providing amplification closely adjacent to the radiating elements, a significant improvement in efficiency, noise, gain; and radiated power characteristics of the antenna can be realized.

The power supply circuit 44, for example, by using a capacitive discharge approach, minimizes the losses associated with long, high-current paths and reduces the peak power demands normally required for power supplies in these types of applications.

Some important performance characteristics of the transceiver module 20a, according to a presently preferred embodiment, are as follows:

| | |
|---|---|
| Transmit Mode | |
| Frequency | 5250 MHz to 5350 MHz |
| Gain | 12 dB |
| Output Power | +40 dBm (10 watts) |
| Input/Output VSWR | 2:1 |
| Pulse Width | 33 Microseconds |
| Duty Cycle | 5.3 Percent |
| Receive Mode | |
| Frequency | 5250 MHz to 5350 MHz |
| Gain | 20 dB |
| Noise Figure | 3 dB |
| Input/Output VSWR | 1.5:1 |

We claim:

1. A transmitting and receiving module for amplifying signals in an antenna array, comprising:
   signal-receiving means, comprising:
   means for providing a low-loss path for a received signal from at least one antenna element of said array to provide a reception mode;
   means at the input of the signal-receiving means for limiting the signal amplitude of the received signal to a predetermined level;
   means for amplifying the received signal;
   means for normalizing the phase of each amplified received signal; and
   means for switching the amplified signal to an output connector; and
   signal-transmitting means, comprising:
   means for switching the module to a transmission mode;
   means for adjusting the phase of a signal to be transmitted;
   means for amplifying the adjusted signal to be transmitted; and means for providing a low-loss path for the amplified signal to be transmitted to an antenna connection.

2. The module of claim 1 wherein said signal-amplitude-limiting means comprises a PIN diode in shunt with the received signal.

3. The module of claim 1 wherein said means for amplifying said received signal comprises a low-noise amplifier.

4. The module of claim 1 wherein said means for amplifying the adjusted transmitted signal comprises a high-power amplifier.

5. The module of claim 4 wherein said high-power amplifier comprises a pulsed amplifier powered from a current storage circuitry which includes a power supply having relatively low-current rectifier and a high-capacitance filter network and a switching device to provide high-pulse currents to the high-power amplifier during its pulsed operation.

6. The module of claim 1 wherein the means for normalizing the phase of the received signal includes a plurality of capacitively tuned stub tuners that may be individually imposed on the amplified received signal, and wherein said means for adjusting the phase of the signal to be transmitted includes a plurality of capacitively tuned stub tuners that may be individually imposed on the signal to be transmitted.

7. A transmitter and receiver module for use with radiating antenna elements of a phased array antenna system, comprising:

a small housing forming first and second coaxial connections, said first coaxial connection being adapted for connection with a system control for generating, controlling, and permitting the use of electromagnetic energy transmitted from and received by the phased array antenna system, said second coaxial connection being adapted for connection with a radiating antenna element;

a circulator for electromagnetic energy located within said housing adjacent and connected with said coaxial antenna connection, said circulator having an input connection and an output connection;

a pulsed high-power amplifier for electromagnetic energy centrally located within said housing at one side thereof having its output connected with an input connection of the circulator and its input connected with a first phase-adjusting network located within said housing near the coaxial system connection;

a signal-limiting means connected with the output of the circulator for limiting the electromagnetic energy passing therethrough;

a low-noise amplifier for electromagnetic energy located centrally within said housing at the other side thereof having its input connected with the signal-limiting means and its output connected with a second phase-adjusting network located near the coaxial system connection; and a transmit and receive switch located and connected between the first and second phase-adjusting networks and the coaxial system connection.

8. The module of claim 7 wherein said housing forms a ground plane for said electromagnetic energy passing therethrough.

9. The module of claim 7 wherein said first and second phase-adjusting networks each include a plurality of stub tuners, each stub tuner presenting a capacitive load.

10. The module of claim 7 wherein said transmit and receive switch comprises means forming a first signal pathway from said first coaxial connection to said high-power amplifier, with a first PIN diode connected in shunt with the first signal pathway at a point equal to one-quarter wavelength of the electromagnetic energy being transmitted and received, means forming a second signal pathway from said first coaxial connection to said low-noise amplifier with a second PIN diode connected in shunt with the second signal pathway at a point equal to one-quarter wavelength of the electromagnetic energy being transmitted and received, and first and second dc connections to said first and second PIN diodes, respectively, to control the impedance of the first and second signal pathways at the first coaxial connection.

11. A transceiver module for location adjacent an antenna element of a phased array microwave antenna system comprising:

a conductive housing; and a microstrip substate within the conductive housing forming a first pathway for transmission of microwave energy to the antenna element and a second pathway for transmission of microwave energy from the antenna element, said housing and said microstrip substrate including a first coaxial connection to a system control, and a second coaxial connection to said antenna element, said first and second pathways extending from and connecting with said first coaxial connection and including PIN diodes connected with each of the first and second pathways at a distance equal to one-quarter wavelength of the microwave energy of the system to form a transmit/receive switch, said first pathway extending from said transmit/receive switch and being connected with a first plurality of stub tuners, from said first plurality of stub tuners to a high-power amplifier for amplification of said signal to be transmitted, and from said high-power amplifier to a circulator for transmission to said second coaxial connection, said circulator forming a low-loss path from said high-power amplifier to said second coaxial connection, and a low-loss path from said second coaxial connection to said second pathway, said second pathway extending from and connecting with said circulator and including a PIN diode connected with said second pathway, and further extending from said PIN diode limiter to a low-noise amplifier for said received microwave energy, said second pathway further connecting said amplified received signal with a second plurality of stub tuners whose effective impedance may be varied to control the phase of the amplified received signal and extending from said second plurality of stub tuners through said transmit/receive switch to said first coaxial connection, said housing also carrying a plurality of connections to control the impedances of the PIN diodes of the transmit/receive switch.

* * * * *